United States Patent
Liu et al.

(10) Patent No.: US 9,477,869 B2
(45) Date of Patent: Oct. 25, 2016

(54) MUTUAL-CAPACITANCE PALM PRINT IDENTIFICATION METHOD, MUTUAL-CAPACITANCE PALM PRINT IDENTIFICATION DEVICE AND MUTUAL-CAPACITANCE PALM PRINT IDENTIFICATION TOUCH PANEL

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Haodi Liu, Beijing (CN); Benyin Ye, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 14/548,990

(22) Filed: Nov. 20, 2014

(65) Prior Publication Data

US 2015/0356337 A1 Dec. 10, 2015

(30) Foreign Application Priority Data

Jun. 5, 2014 (CN) .......................... 2014 1 0246935

(51) Int. Cl.
*G06K 9/00* (2006.01)
(52) U.S. Cl.
CPC ............. *G06K 9/0002* (2013.01); *G06K 9/001* (2013.01); *G06K 9/0008* (2013.01); *G06K 9/00087* (2013.01)

(58) Field of Classification Search
None
See application file for complete search history.

(56) References Cited

U.S. PATENT DOCUMENTS

| | | | | |
|---|---|---|---|---|
| 6,370,263 B1* | 4/2002 | Hiratsuka | .......... | G06K 9/00067 382/115 |
| 2012/0105081 A1* | 5/2012 | Shaikh | ................. | G06K 9/0002 324/686 |
| 2012/0182253 A1* | 7/2012 | Brosnan | ................ | G06F 3/0416 345/174 |
| 2013/0272586 A1* | 10/2013 | Russo | ................ | G06K 9/00087 382/124 |
| 2015/0242673 A1* | 8/2015 | Singhal | .............. | G06K 9/00013 345/174 |
| 2015/0324625 A1* | 11/2015 | Mo | .................... | G06K 9/00013 382/124 |

* cited by examiner

*Primary Examiner* — Wesley Tucker
(74) *Attorney, Agent, or Firm* — Nath, Goldberg & Meyer; Joshua B. Goldberg; Leonid D. Thenor (57) ABSTRACT

Provided is a mutual-capacitance palm print identification method, a mutual-capacitance palm print identification device and a mutual-capacitance palm print identification touch panel. The method includes: forming a palm template information by using a mutual-capacitance touch panel to acquire a capacitive sensing data obtained from a palm pressing by a user; forming a current user's palm information by using the mutual-capacitance touch panel to acquire a capacitive sensing data obtained from a palm pressing by the current user; and comparing the current user's palm information with the palm template information and outputting the result of the comparison. It is unnecessary to add extra parts for the present invention, and thus the cost is low. Moreover, a palm of a living body is required, it is difficult to be cracked and counterfeited.

14 Claims, 6 Drawing Sheets

| | 0 | 1 | 2 | 3 | 4 | 5 | 6 | 7 | 8 | 9 | 10 | 11 | 12 |
|---|---|---|---|---|---|---|---|---|---|---|---|---|---|
| 22 | 0 | 1 | 1 | 0 | 0 | 0 | 0 | 0 | 0 | 1 | 0 | 0 | 0 |
| 21 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 1 |
| 19 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 15 | 0 | 0 | 0 | 0 | -1 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | -1 | 0 | 0 | 0 | 0 |
| 11 | 0 | 0 | 0 | 0 | -1 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

FIG. 3

| 22 | -3  | 12  | 49 | 37 | 6  | 13 | 50 | 61 | 17 | 1  | 20 | 51 | 31 |
|----|-----|-----|----|----|----|----|----|----|----|----|----|----|----|
| 21 | -1  | 12  | 58 | 55 | 9  | 5  | 17 | 27 | 9  | 0  | 6  | 42 | 26 |
| 20 | 3   | 13  | 55 | 53 | 12 | 4  | 11 | 13 | 5  | 3  | 5  | 24 | 20 |
| 19 | 5   | 11  | 33 | 38 | 13 | 7  | 10 | 11 | 7  | 5  | 6  | 13 | 13 |
| 18 | 1   | 4   | 18 | 21 | 9  | 6  | 9  | 13 | 10 | 7  | 8  | 13 | 14 |
| 17 | -8  | -8  | -5 | 0  | 6  | 10 | 18 | 37 | 26 | 24 | 34 | 34 | 29 |
| 16 | -7  | -5  | -4 | 9  | 26 | 39 | 43 | 49 | 45 | 42 | 41 | 41 | 37 |
| 15 | -13 | -11 | -9 | 27 | 41 | 45 | 46 | 44 | 41 | 35 | 30 | 28 | 25 |
| 14 | -12 | -9  | 0  | 29 | 46 | 48 | 47 | 45 | 45 | 38 | 32 | 24 | 27 |
| 13 | 0   | 23  | 29 | 30 | 35 | 45 | 42 | 41 | 39 | 37 | 32 | 22 | 22 |
| 12 | 16  | 35  | 31 | 23 | 15 | 25 | 24 | 19 | 25 | 33 | 29 | 21 | 14 |
| 11 | 49  | 44  | 40 | 30 | 7  | 3  | 4  | 4  | 14 | 25 | 26 | 27 | 35 |
| 10 | 51  | 46  | 39 | 20 | 2  | 0  | 0  | 0  | 5  | 9  | 21 | 30 | 36 |
| 9  | 55  | 43  | 17 | 7  | 1  | 0  | -1 | -1 | 0  | 8  | 39 | 34 | 37 |
| 8  | 52  | 42  | 20 | 6  | 2  | 0  | 0  | -1 | 0  | 17 | 35 | 36 | 36 |
| 7  | 47  | 39  | 32 | 20 | 5  | -4 | -5 | -4 | 0  | 29 | 29 | 27 | 29 |
| 6  | 50  | 43  | 35 | 34 | 25 | 0  | -5 | -4 | 8  | 40 | 36 | 27 | 29 |
| 5  | 46  | 40  | 31 | 33 | 44 | 16 | -5 | -6 | 20 | 36 | 32 | 24 | 27 |
| 4  | 45  | 37  | 30 | 29 | 41 | 34 | 0  | -4 | 20 | 31 | 28 | 25 | 27 |
| 3  | 43  | 35  | 28 | 27 | 40 | 39 | 4  | -4 | 16 | 28 | 26 | 23 | 25 |
| 2  | 43  | 38  | 30 | 30 | 42 | 43 | 18 | 0  | 24 | 34 | 30 | 22 | 27 |
| 1  | 44  | 38  | 29 | 30 | 41 | 43 | 40 | 30 | 37 | 35 | 30 | 22 | 28 |
| 0  | 39  | 30  | 22 | 21 | 36 | 36 | 37 | 37 | 33 | 27 | 22 | 18 | 22 |
|    | 0   | 1   | 2  | 3  | 4  | 5  | 6  | 7  | 8  | 9  | 10 | 11 | 12 |

FIG. 4

| 22 | 27 | 22 | 40 | 46 | 33 | 19 | 34 | 38 | 27 | 20 | 10 | 13 | 26 |
|---|---|---|---|---|---|---|---|---|---|---|---|---|---|
| 21 | 33 | 27 | 41 | 44 | 9 | 0 | 9 | 38 | 31 | 25 | 18 | 19 | 31 |
| 20 | 34 | 30 | 37 | 35 | 0 | -6 | -1 | 30 | 29 | 25 | 18 | 21 | 36 |
| 19 | 36 | 33 | 39 | 23 | -2 | -6 | -4 | 25 | 31 | 29 | 21 | 24 | 39 |
| 18 | 37 | 29 | 32 | 9 | -3 | -5 | -3 | 15 | 31 | 26 | 19 | 21 | 34 |
| 17 | 43 | 32 | 13 | 0 | -1 | -2 | -1 | 3 | 35 | 34 | 28 | 28 | 40 |
| 16 | 39 | 21 | 2 | -6 | -3 | -3 | -3 | -3 | 23 | 34 | 26 | 27 | 41 |
| 15 | 33 | 14 | 0 | -3 | 0 | 0 | 0 | -3 | 8 | 37 | 29 | 32 | 42 |
| 14 | 44 | 27 | 1 | 0 | 2 | 2 | 0 | -1 | 1 | 30 | 31 | 31 | 40 |
| 13 | 40 | 32 | 5 | 1 | 13 | 10 | 8 | 13 | 17 | 18 | 20 | 20 | 23 |
| 12 | 37 | 34 | 16 | 14 | 33 | 27 | 27 | 33 | 32 | 26 | 14 | 16 | 6 |
| 11 | 30 | 28 | 24 | 33 | 42 | 40 | 33 | 31 | 28 | 22 | 11 | -3 | -12 |
| 10 | 23 | 24 | 31 | 41 | 47 | 43 | 40 | 35 | 29 | 23 | 11 | 8 | -11 |
| 9 | -9 | 10 | 33 | 45 | 49 | 44 | 43 | 39 | 33 | 27 | 18 | 18 | 0 |
| 8 | -18 | -1 | 29 | 37 | 42 | 41 | 40 | 35 | 30 | 26 | 16 | 16 | 1 |
| 7 | -10 | -5 | 18 | 28 | 37 | 42 | 41 | 41 | 38 | 37 | 29 | 26 | 0 |
| 6 | -12 | -11 | 1 | 5 | 13 | 23 | 27 | 26 | 33 | 34 | 31 | 12 | -6 |
| 5 | 4 | 11 | 12 | 6 | 7 | 11 | 10 | 11 | 9 | 13 | 24 | 15 | 5 |
| 4 | 6 | 22 | 20 | 6 | 5 | 8 | 8 | 6 | 2 | 3 | 17 | 19 | 6 |
| 3 | 5 | 37 | 27 | 2 | 1 | 4 | 4 | 1 | -3 | 0 | 24 | 33 | 7 |
| 2 | 5 | 38 | 20 | 2 | 3 | 8 | 7 | 1 | -3 | 1 | 41 | 46 | 11 |
| 1 | 1 | 10 | 8 | 1 | 4 | 14 | 16 | 1 | -4 | 8 | 52 | 52 | 14 |
| 0 | 0 | 2 | 0 | 0 | 2 | 15 | 21 | 0 | -5 | 9 | 50 | 48 | 9 |
|   | 0 | 1 | 2 | 3 | 4 | 5 | 6 | 7 | 8 | 9 | 10 | 11 | 12 |

MUTUAL-CAPACITANCE PALM PRINT IDENTIFICATION METHOD, MUTUAL-CAPACITANCE PALM PRINT IDENTIFICATION DEVICE AND MUTUAL-CAPACITANCE PALM PRINT IDENTIFICATION TOUCH PANEL

FIELD OF THE INVENTION

The present invention relates to the field of information identification, and particularly to a mutual-capacitance palm print identification method, a mutual-capacitance palm print identification device and a mutual-capacitance palm print identification touch panel.

BACKGROUND OF THE INVENTION

The technology of palm print identification has been widely used in the past several decades, as features of a palm print have high stability and are not easily affected by changes in environment or physiology. At present, a kind of main palm print identification method is CCD optical image extraction method, in which four processes of a CCD image acquisition, a feature extraction for palm print, a storage of feature data and a comparison and matching of eigenvalues are performed to complete an identification. Based on the principle of total reflection of light, the method acquires an image of a palm print and extracts image information by using a CCD. Then, a clear palm print image is obtained after information processes such as filtering and image enhancing. The clear palm print image is then converted into feature data, thereby feature information is obtained.

However, this method requires a CCD device to transmit optical information, which has a large volume and high power consumption. Moreover, the palm print image used therein is easily to be duplicated and the method cannot distinguish a living body and a non-living body, thus its safety is poor.

On the other hand, the most important feature of a palm print is line feature, and the clearest lines among line features are basically invariable during one's whole life, and can be clearly identified in a case of low resolution. Thus, by using capacitive identification data as a combination of line features, point features, texture features and geometric features of a palm, one's identity can be completely confirmed.

SUMMARY OF THE INVENTION (1) Technical Problems Need to be Solved

The present invention provides a mutual-capacitance palm print identification method, a mutual-capacitance palm print identification device and a mutual-capacitance palm print identification touch panel, so as to solve the technical problems of high power consumption and poor safety existed in the palm print identification methods of the prior art.

(2) Technical Solutions

To solve the above technical problems, the present invention provides a mutual-capacitance palm print identification method, the method includes:

forming palm template information by using a mutual-capacitance touch panel to acquire capacitive sensing data obtained from a palm pressing by a user;

forming current user's palm information by using the mutual-capacitance touch panel to acquire capacitive sensing data obtained from a palm pressing by the current user; and comparing the current user's palm information with the palm template information and outputting the result of the comparison.

Further, a filtering and noise reduction process, a signal amplification process and an analog-to-digital conversion process are performed on the capacitive sensing data obtained from the palm pressing.

Further, the comparing the current user's palm information with the palm template information and outputting the result of the comparison includes:

performing a data processing on the current user's palm information, performing a feature information point detection, a large area information point detection, a line information detection, a non-reporting detection and a relative position detection successively, and performing an analysis on an error detected by each of the detections, wherein the relative position detection is used to detect the relative positions among the detected results obtained from the feature information point detection, the large area information point detection, the line information detection and the non-reporting detection.

Further, the comparing the current user's palm information with the palm template information and outputting the result of the comparison also includes:

comparing the error detected by each of the detections with a predetermined corresponding error threshold and analyzing, and if each of the errors detected by the detections is smaller than the predetermined corresponding error threshold, the identification of the current user's palm information is successful; otherwise, the identification is failed.

Further, the method includes:

correcting the stored corresponding palm template information by using the current user's palm information after the current user's palm information is successfully identified.

In another aspect, the present invention also provides a mutual-capacitance palm print identification device, including:

a touch sensor which is used to, through a mutual-capacitance touch panel, acquire capacitive sensing data obtained from a palm pressing by a user and form user's palm template information and current user's palm information;

a touch controller which is used to control the touch sensor for acquiring the capacitive sensing data and process and store the obtained palm template information and the current user's palm information; and an identification unit which is used to compare the processed current user's palm information with the processed palm template information and output the result of the comparison.

Further, the touch controller also includes:

a filtering module which is used to perform a filtering and noise reduction process on the obtained capacitive sensing data;

an amplification module which is used to perform a signal amplification process on the filtered and noise reduced capacitive sensing data; and an analog-to-digital conversion module which is used to perform an analog-to-digital conversion process on the amplified capacitive sensing data.

Further, the identification unit includes:

a feature information point detection module which is used to perform a feature information point detection on the current user's palm information and output a detected error;

a large area information point detection module which is used to perform a large area information point detection on the current user's palm information and output a detected error;

a line information detection module which is used to perform a line information detection on the current user's palm information and output a detected error;

a non-reporting detection module which is used to perform a non-reporting detection on the current user's palm information and output a detected error; and a relative position detection module which is used to detect the relative positions among the detected results obtained from the feature information point detection, the large area information point detection, the line information detection and the non-reporting detection and output a detected error.

Further, the identification unit also includes:

a judgment module which is connected with the feature information point detection module, the large area information point detection module, the line information detection module, the non-reporting detection module and the relative position detection module, respectively, and is used to compare the detected errors output from the feature information point detection module, the large area information point detection module, the line information detection module, the non-reporting detection module and the relative position detection module with the predetermined corresponding error thresholds, and if each of the detected errors is smaller than the predetermined corresponding error threshold, it is judged that the current user's palm information is successfully identified; otherwise, the identification is failed.

Further, the identification unit also includes:

a correction module which is used to correct the stored corresponding palm template information by using the current user's palm information after the current user's palm information is successfully identified.

In yet another aspect, the present invention also provides a mutual-capacitance palm print identification touch panel, including any one of the above mutual-capacitance palm print identification devices.

(3) Beneficial Effects

According to the mutual-capacitance palm print identification method, the mutual-capacitance palm print identification device and the mutual-capacitance palm print identification touch panel provided by the embodiments of the present invention, by taking the principle that the texture of a palm is rough and uneven, current user's capacitive sensing data can be acquired in a mutual-capacitance touch manner, so as to form the current user's palm information and compare it with pre-stored palm template information to complete an identification. For the embodiments of the present invention, it is unnecessary to add extra parts, and thus the cost is low. Moreover, a palm of a living body is required, it is difficult to be cracked and counterfeited. Furthermore, according to the embodiments of the present invention, the palm print is easily to be acquired and identified locally due to the large amount of palm print information, and the palm print information having invariability and uniqueness can be used for various purposes such as a mobile phone unlock, a password input, an ID verification or an access control.

BRIEF DESCRIPTION OF THE DRAWINGS

To describe the technical solutions in the embodiments of the present invention or in the prior art more clearly, the accompanying drawings to be used for describing the embodiments or the prior art will be briefly introduced as below. Apparently, the accompanying drawings in the following description are merely some embodiments of the present invention, and a person skilled in the art may obtain other drawings from these accompanying drawings without any creative effort.

DETAILED DESCRIPTION OF THE EMBODIMENTS

To make the objectives, technical solutions and advantages of the embodiments of the present invention more clearly, the technical solutions in the embodiments of the present invention will be described as below in details with reference to the accompanying drawings. Apparently, the described embodiments are merely a part of but not all of embodiments of the present invention. Based on the embodiments in the present invention, all of other drawings made by a person skilled in the art without any creative effort shall fall into the protection scope of the present invention.

Figure 1:
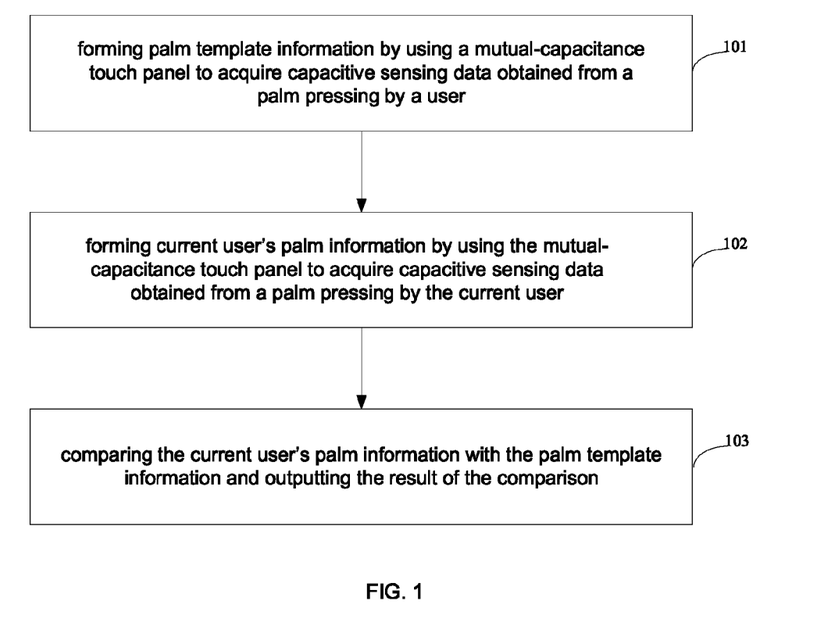
FIG. 1 is a basic flow diagram of a mutual-capacitance palm print identification method according to an embodiment of the present invention.

According to an embodiment of the present invention, provided is a mutual-capacitance palm print identification method, as shown in FIG. 1, the method includes:

step 101, forming palm template information by using a mutual-capacitance touch panel to acquire capacitive sensing data obtained from a palm pressing by a user;

step 102, forming current user's palm information by using the mutual-capacitance touch panel to acquire capacitive sensing data obtained from a palm pressing by the current user; and step 103, comparing the current user's palm information with the palm template information and outputting the result of the comparison.

In the mutual-capacitance palm print identification method according to the embodiment of the present invention, by taking the principle that the texture of a palm is rough and uneven, current user's capacitive sensing data can be acquired in a mutual-capacitance touch manner, so as to form the current user's palm information and compare it with pre-stored palm template information to complete an identification. For the embodiments of the present invention, it is unnecessary to add extra parts, and thus the cost is low. Moreover, a palm of a living body is required, it is difficult to be cracked and counterfeited. Furthermore, according to the embodiments of the present invention, the palm print is easily to be acquired and identified locally due to the large amount of palm print information, and the palm print information having invariability and uniqueness can be used for various purposes such as a mobile phone unlock, a password input, an ID verification or an access control.

In the realization of the palm print identification method according to the embodiments of the present invention, when a palm presses a panel in a large area, by taking the principle that the conductivity is different in subcutaneous layers of different parts, different capacitance values can be acquired, and thus capacitive sensing data corresponding to the palm template information and the current user's palm information, respectively, can be acquired. The acquired capacitive sensing data can then be processed in data processing. Preferably, a filtering and noise reduction process, a signal amplification process and an analogy-to-digital conversion process may be performed on the capacitive sensing data.

After the current user's palm information is acquired, it is necessary to compare it with stored palm template information, so as to judge whether or not they match with each other, thereby judging whether or not the identification is successful. Specifically, first, feature information of the current user's palm may be extracted. The extracted feature information is then sorted in terms of their relative positions. After that, each of the detections including a feature information point detection, a large area information point detection, a line information detection and a non-reporting detection are performed successively with calling the pre-stored palm template information. Finally, in respect of relative positions of the detected results obtained from the feature information point detection, the large area information point detection, the line information detection and the non-reporting detection, a relative position detection is performed. Wherein, in each of the detections, a detected error (that is, a difference between the detected result and the stored corresponding palm template information) is compared with a predetermined corresponding error threshold and is analyzed, so as to judge whether or not the identification is successful. If each of the detected errors is smaller than the corresponding error threshold, the current user's palm information is recognized as matching with the stored palm template information, and the identification is successful. Otherwise, if one or more of detected errors are not smaller than the corresponding error thresholds, it is recognized that the identification is failed. Furthermore, the acquisition and detection of information can be performed again.

If the current user's palm information matches with the stored palm template information and the identification is successful, the acquired current user's palm information may be used to self-correct the palm template information, thereby enriching the stored palm template data. Thus, the accuracy of the template and the reliability of the identification are improved.

In acquisition process for the current user's palm information, if the identifications are failed several times, the information acquisition operation may be terminated or an error message may be alarmed according to a predetermined times threshold for comparison.

Figure 2:
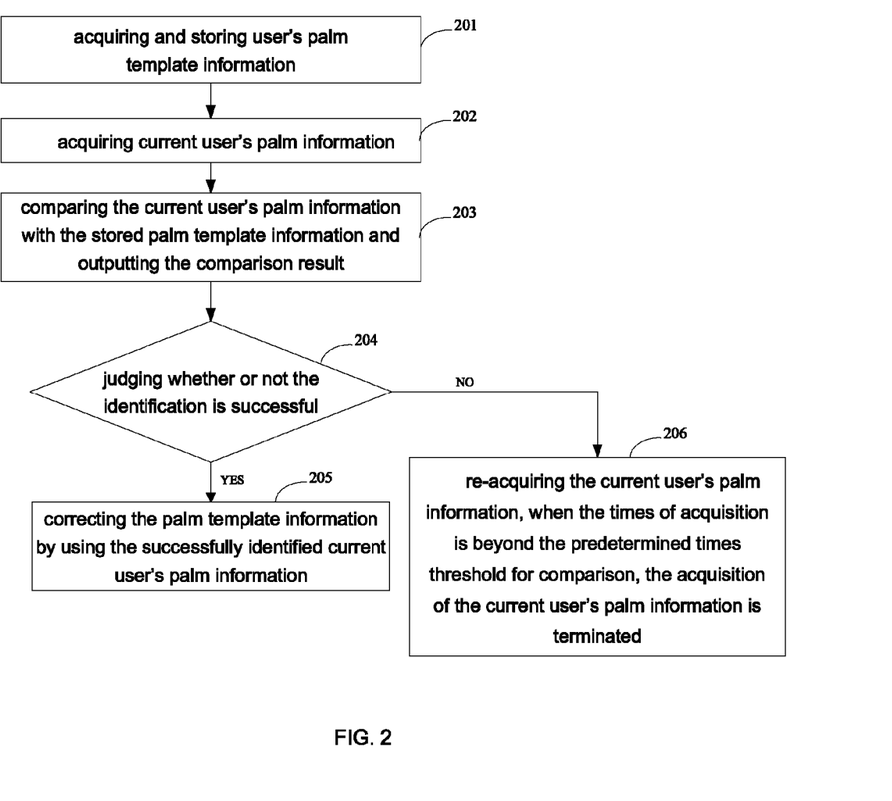
FIG. 2 is a preferred flow diagram of a mutual-capacitance palm print identification method according to an embodiment of the present invention.

By taking that identification and detection is performed on a user's palm print through a mutual-capacitance touch panel as an example, the specific realization of the palm print identification method according to an embodiment of the present invention will be described in more details, as shown in FIG. 2.

Step 201, acquiring and storing palm template information.

Figure 3:
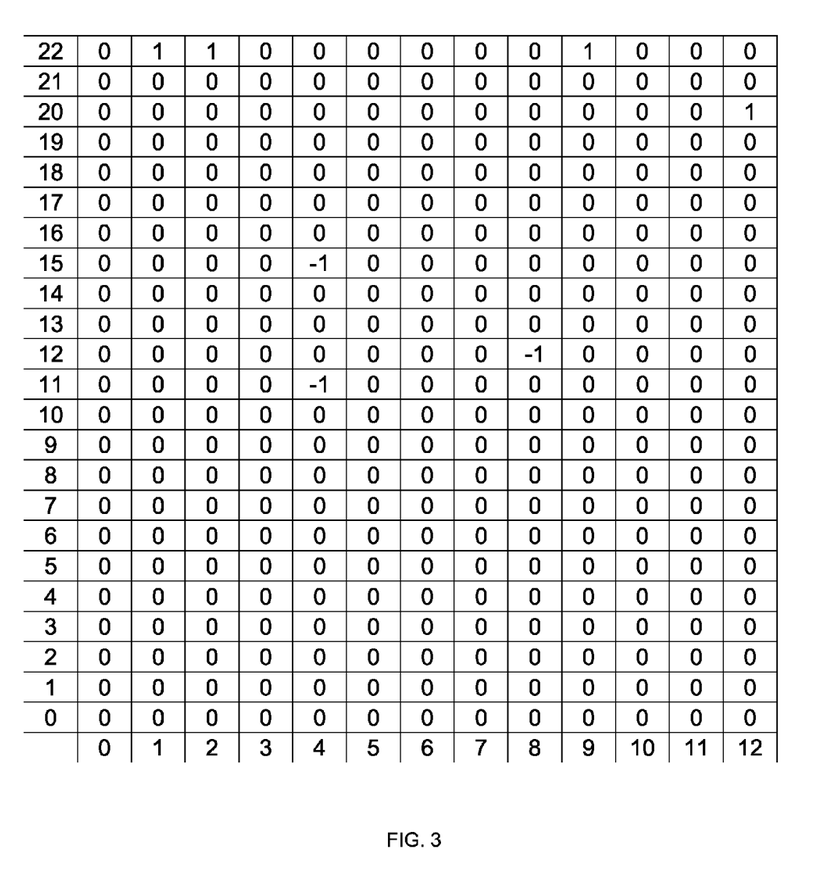
FIG. 3 is a schematic diagram showing initial capacitive sensing data acquired on each of the areas that are not being touched according to an embodiment of the present invention.
Figure 4:
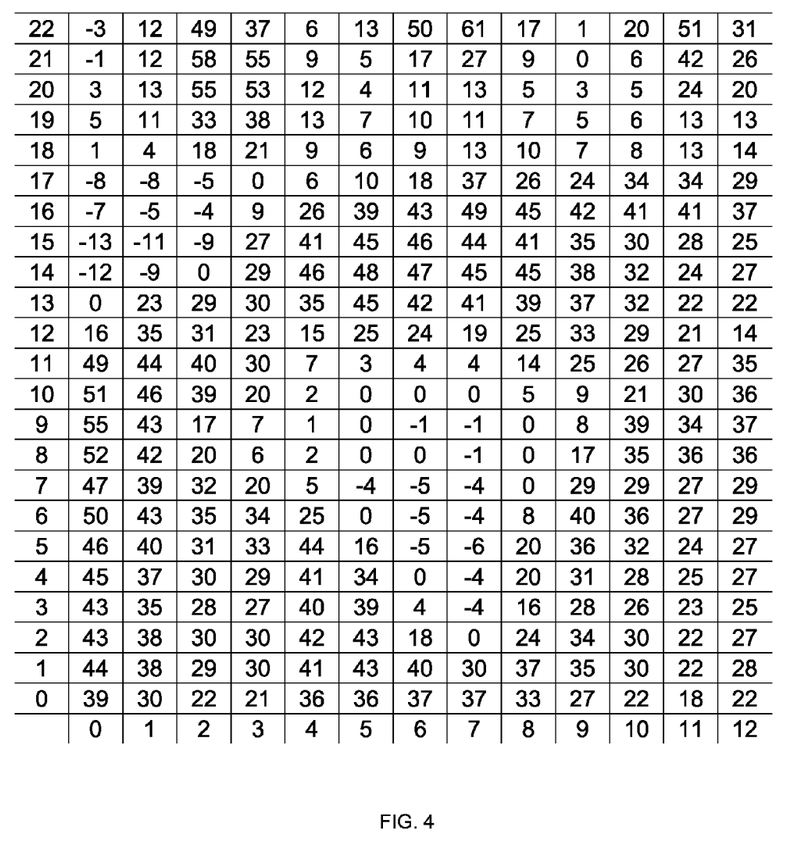
FIG. 4 is a schematic diagram showing acquired user's capacitive sensing data according to an embodiment of the present invention.

The mutual-capacitance touch panel in the embodiment of the present invention is divided into a plurality of areas (from 0 to 12 in horizontal direction and from 0 to 22 in vertical direction), when a touch is not performed by a user, initial capacitance values within each of these areas are as shown in FIG. 3.

In this step, by using the mutual-capacitance touch panel, palm information is firstly acquired from a palm pressing by a user. After a capacitance value that is produced by the palm pressing on the touch panel is sensed, a filtering process, an amplification process and an analog-to-digital conversion process may be performed on the acquired data, and then palm template information is generated in an appropriate algorithm. After that, the palm template information is encrypted and stored, which reflects a part or whole of the user's palm.

Step 202: acquiring current user's palm information.

Figure 5:
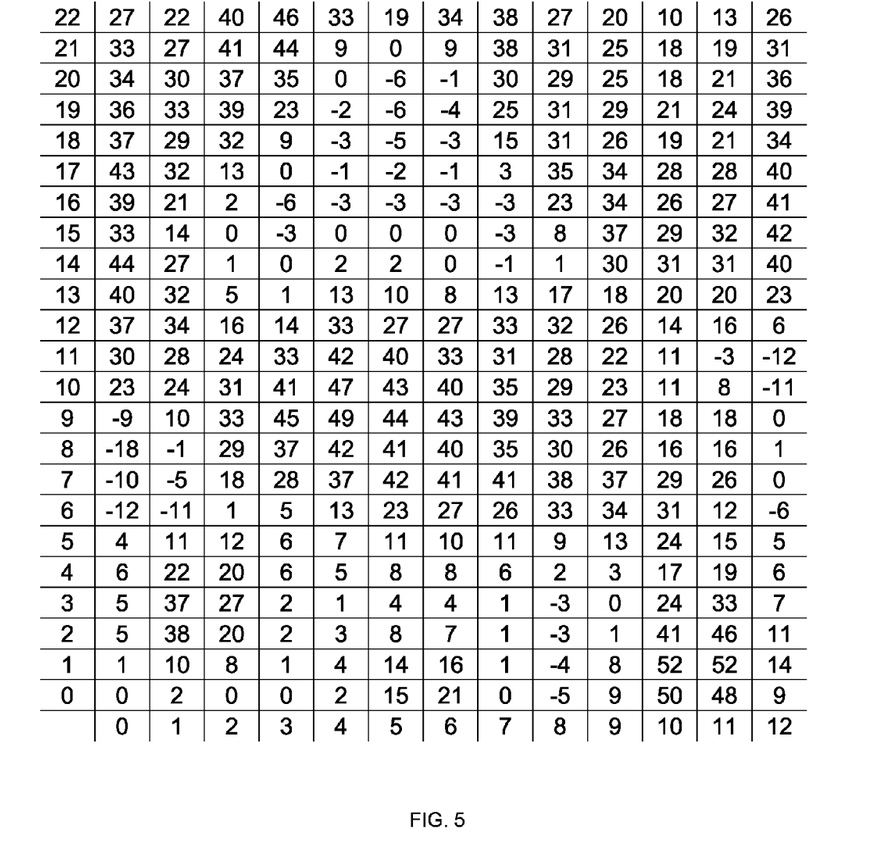
FIG. 5 is a schematic diagram showing acquired current user's capacitive sensing data according to an embodiment of the present invention.

In this step, capacitive sensing data is acquired when a current user is instructed to press the mutual-capacitance touch panel, such that the current user's palm information is formed. The filtering process, the amplification process and the analog-to-digital conversion process may also be performed on the acquired data, and the results are as shown in FIG. 5. When the palm is pressing, different sampled data may be acquired in respect to different parts of the palm, and meanwhile, the more the number of divided areas in an unit area are, the more the accuracy of the sampled data is. The structure of the mutual-capacitance touch panel in the embodiments of the present invention is not limited, but the stronger the capacitive signal is, the better the sensing performance is.

Step 203: comparing the current user's palm information with the stored palm template information and outputting the comparison result.

The capacitive sensing data will be changed when the user's palm is pressed on the touch panel, which will lead to various changes of the capacitive sensing data when considering the shape and the relatively fixed position of the palm. Thus, the current user's palm information may be compared with the stored palm template information to complete the palm print identification process.

In this step, feature information of the current user's palm is firstly extracted, the extracted feature information is then sorted in terms of their relative positions, each of detections are then performed successively with calling the pre-stored palm template information, the detections used herein include a feature information point detection, a large area information point detection, a line information detection, a non-reporting detection, a relative position detection, and the like. Specifically, the feature information point detection may be used to detect unique point features of the palm print; the large area information point detection is used to detect the large area geometric feature of the root of the thumb of the palm, generally, the lines and the feature points are not clear within the triangular region of the thumb's root, thus it is mainly to detect its geometric feature; the line information detection is used to detect the line feature for each of the main lines; the non-reporting detection is used to detect the information about the non-pressing positions of the palm. When all of the feature information point detection, the large area information point detection, the line information detection and the non-reporting detection are performed, the relative positions among those detected results can be obtained by summarizing all the detected results, and the relative position detection is performed.

According to the above detection processes, one's identity can be completely confirmed.

Wherein, in each of those detections, an error threshold should be predetermined based on actual practices. Then, a detected error (that is, a difference between the detected result and the stored corresponding palm template information) is compared with the predetermined corresponding error threshold and is analyzed. If each of the detected errors is smaller than the corresponding error threshold, the current user's palm information is recognized as matching with the stored palm template information, and the identification is successful. Otherwise, if one or more of detected errors are not smaller than the corresponding error thresholds, it is recognized that the identification is failed.

Step 204, judging whether or not the identification is successful. If it is yes, the process proceeds to step 205; if no, the process turns to step 206.

Step 205, correcting the palm template information by using the successfully identified current user's palm information.

If the current user's palm information matches with the stored palm template information and the identification is successful, the capacitive sensing data in the acquired current user's palm information may be used to self-correct the palm template information, thereby enriching the stored palm template data. Thus, the accuracy of the template and the reliability of the identification are improved.

Step 206, re-acquiring the current user's palm information. When the times of acquisition is beyond that of the predetermined times threshold for comparison, the acquisition of the current user's palm information is terminated.

Here, the predetermined times threshold for comparison is determined based on actual practices, for example, 3 times or 5 times. When the times of acquisition is beyond the predetermined times threshold for comparison, an alarm may be reported and the information acquisition process is terminated.

At this point, the processes of the palm print identification and the detections according to the mutual-capacitance palm print identification method provided by the embodiments of the present invention have been completed.

Figure 6:
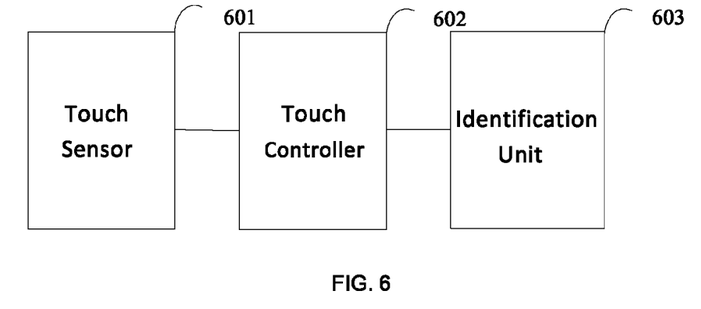
FIG. 6 is a schematic diagram showing a basic structure of a mutual-capacitance palm print identification device according to an embodiment of the present invention.

The present invention further provides a mutual-capacitance palm print identification device, as shown in FIG. 6, including:

a touch sensor 601 which is used to, through a mutual-capacitance touch panel, acquire capacitive sensing data obtained from a palm pressing by a user and form user's palm template information and current user's palm information;

a touch controller 602 which is used to control the touch sensor for acquiring the capacitive sensing data and process and store the obtained palm template information and the current user's palm information;

an identification unit 603 which is used to compare the processed current user's palm information with the processed palm template information and output the result of the comparison.

Figure 7:
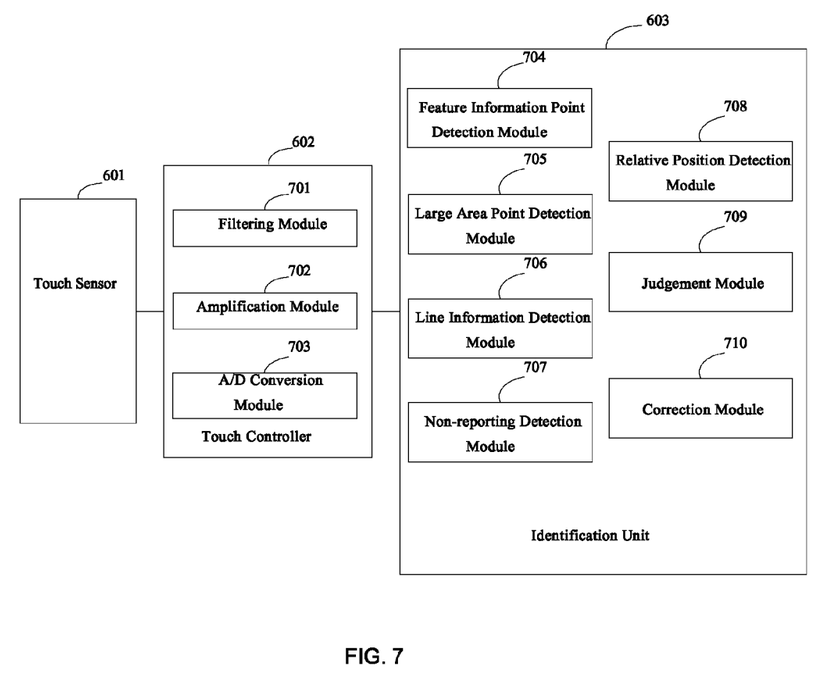
FIG. 7 is a schematic diagram showing a preferred structure of a mutual-capacitance palm print identification device according to an embodiment of the present invention

Preferably, the touch controller 602 further includes: a filtering module 701, as shown in FIG. 7, which is used to perform a filtering and noise reduction process on the obtained capacitive sensing data; an amplification module 702 which is used to perform a signal amplification process on the filtered and noise reduced capacitive sensing data; and an analog-to-digital conversion module which is used to perform an analog-to-digital conversion process on the amplified capacitive sensing data.

Preferably, the identification unit 603 further includes:

a feature information point detection module 704 which is used to perform a feature information point detection on the current user's palm information and output a detected error;

a large area information point detection module 705 which is used to perform a large area information point detection on the current user's palm information and output a detected error;

a line information detection module 706 which is used to perform a line information detection on the current user's palm information and output a detected error;

a non-reporting detection module 707 which is used to perform a non-reporting detection on the current user's palm information and output a detected error; and a relative position detection module 708 which is used to detect the relative positions among the detected results obtained from the feature information point detection, the large area information point detection, the line information detection, the non-reporting detection and output a detected error.

Preferably, the identification unit 603 further includes: a judgment module 709 which is connected with the feature information point detection module 704, the large area information point detection module 705, the line information detection module 706, the non-reporting detection module 707 and the relative position detection module 708, respectively, and is used to compare the detected errors output from the feature information point detection module 704, the large area information point detection module 705, the line information detection module 706, the non-reporting detection module 707 and the relative position detection module 708 with the predetermined corresponding error thresholds, respectively. If each of the detected errors is smaller than the predetermined corresponding error threshold, it is judged that the current user's palm information is successfully identified; otherwise, the identification is failed.

Preferably, the identification unit further includes: a correction module 710 which is used to correct the corresponding palm template information stored by the touch controller 602 by using the current user's palm information after the current user's palm information is successfully identified.

The mutual-capacitance palm print identification device can be formed as a whole, or it can be constitute by a plurality of separated parts, as long as it has each of the above function units. The person skilled in the art may employ hardware, software, firmware or any combination thereof to realize the above function units, thereby forming the mutual-capacitance palm print identification device of the present invention.

The embodiments of the present invention further provides a mutual-capacitance palm print identification touch panel, including the above mutual-capacitance palm print identification device. The touch panel can be applied to a smart phone, a liquid crystal display, a personal computer, a television, and the like.

The embodiments of the present invention at least have the following beneficial effects:

According to the mutual-capacitance palm print identification method, the mutual-capacitance palm print identification device and the mutual-capacitance palm print identification touch panel provided by the embodiments of the present invention, by taking the principle that the texture of a palm is rough and uneven, current user's capacitive sensing data can be acquired in a mutual-capacitance touch manner, so as to form the current user's palm information and compare it with pre-stored palm template information to complete an identification. For the embodiments of the present invention, it is unnecessary to add extra parts, and thus the cost is low.

Moreover, a palm of a living body is required, it is difficult to be cracked and counterfeited. Furthermore, according to the embodiments of the present invention, the palm print is easily to be acquired and identified locally due to the large amount of palm print information, and the palm print information having invariability and uniqueness can be used for various purposes such as a mobile phone unlock, a password input, an ID verification or an access control.

Ultimately, it should be noted that the above embodiments are merely used for illustrating the technical solutions of the present invention, but not used for limiting the present invention thereto. Although the present invention has been described in details with reference to the forgoing embodiments, various modifications may be made to the technical solutions described in the forgoing embodiments, or an equivalent substitute may be made to part of the technical features therein, as understood by the person skilled in the art. However, those modifications or substitutes will not make the essence of the corresponding technical solutions departing from the spirit and scope of the technical solutions in the embodiments of the present invention.

What is claimed is:

1. A mutual-capacitance palm print identification method, which includes:
   forming palm template information by using a touch sensor of a mutual-capacitance touch panel to acquire capacitive sensing data obtained from a palm pressing by a user;
   forming current user's palm information by using the touch sensor of the mutual-capacitance touch panel to acquire capacitive sensing data obtained from a palm pressing by the current user; and
   comparing the current user's palm information with the palm template information and outputting the result of the comparison,
   wherein, the comparing the current user's palm information with the palm template information and outputting the result of the comparison includes:
   performing a data processing on the current user's palm information, and performing a feature information point detection, a large area information point detection, a line information detection, a non-reporting detection and a relative position detection successively, and performing an analysis on an error detected by each of the detections, wherein
   the feature information point detection is used for detecting unique point features of the palm print;
   the large area information point detection is used for detecting the large area geometric feature of the root of the thumb of the palm;
   the line information detection is used for detecting the line feature for each of the main lines;
   the non-reporting detection is used for detecting the information about the non-pressing positions of the palm; and
   the relative position detection is used for detecting the relative positions among the detected results obtained from the feature information point detection, the large area information point detection, the line information detection and the non-reporting detection.

2. The mutual-capacitance palm print identification method according to claim 1, wherein, a filtering and noise reduction process, a signal amplification process and an analog-to-digital conversion process are performed on the capacitive sensing data obtained from the palm pressing.

3. The mutual-capacitance palm print identification method according to claim 1, wherein, the comparing the current user's palm information with the palm template information and outputting the result of the comparison further includes:
   comparing the error detected by each of the detections with a predetermined corresponding error threshold and analyzing, and if each of the errors detected by the detections is smaller than the predetermined corresponding error threshold, the identification of the current user's palm information is successful; otherwise, the identification is failed.

4. The mutual-capacitance palm print identification method according to claim 2, wherein, the comparing the current user's palm information with the palm template information and outputting the result of the comparison further includes:
   comparing the error detected by each of the detections with a predetermined corresponding error threshold and analyzing, and if each of the errors detected by the detections is smaller than the predetermined corresponding error threshold, the identification of the current user's palm information is successful; otherwise, the identification is failed.

5. The mutual-capacitance palm print identification method according to claim 3, wherein, the method further includes:
   correcting the stored corresponding palm template information by using the current user's palm information after the current user's palm information is successfully identified.

6. The mutual-capacitance palm print identification method according to claim 4, wherein, the method further includes:
   correcting the stored corresponding palm template information by using the current user's palm information after the current user's palm information is successfully identified.

7. A mutual-capacitance palm print identification device, which includes:
   a touch sensor which is used to, through a mutual-capacitance touch panel, acquire capacitive sensing data obtained from a palm pressing by a user and form user's palm template information and current user's palm information;
   a touch controller which is used to control the touch sensor for acquiring the capacitive sensing data and process and store the obtained palm template information and the current user's palm information; and
   an identification unit which is used to compare the processed current user's palm information with the processed palm template information and output the result of the comparison,
   wherein, the identification unit includes:
   a feature information point detection module which is used to perform a feature information point detection on the current user's palm information and output a detected error, the feature information point detection being used for detecting unique point features of the palm print;
   a large area information point detection module which is used to perform a large area information point detection on the current user's palm information and output a detected error, the large area information point detection being used for detecting the large area geometric feature of the root of the thumb of the palm;

a line information detection module which is used to perform a line information detection on the current user's palm information and output a detected error, the line information detection being used for detecting the line feature for each of the main lines;

a non-reporting detection module which is used to perform a non-reporting detection on the current user's palm information and output a detected error, the non-reporting detection being used for detecting the information about the non-pressing positions of the palm; and a relative position detection module which is used to detect the relative positions among the detected results obtained from the feature information point detection, the large area information point detection, the line information detection and the non-reporting detection and output a detected error.

8. The mutual-capacitance palm print identification device according to claim 7, wherein, the touch controller further includes:

a filtering module which is used to perform a filtering and noise reduction process on the obtained capacitive sensing data;

an amplification module which is used to perform a signal amplification process on the filtered and noise reduced capacitive sensing data; and an analog-to-digital conversion module which is used to perform an analog-to-digital conversion process on the amplified capacitive sensing data.

9. The mutual-capacitance palm print identification device according to claim 7, wherein, the identification unit further includes:

a judgment module which is connected with the feature information point detection module, the large area information point detection module, the line information detection module, the non-reporting detection module and the relative position detection module, respectively, and is used to compare the detected errors output from the feature information point detection module, the large area information point detection module, the line information detection module, the non-reporting detection module and the relative position detection module with the predetermined corresponding error thresholds, and if each of the detected errors is smaller than the predetermined corresponding error threshold, it is judged that the current user's palm information is successfully identified; otherwise, the identification is failed.

10. The mutual-capacitance palm print identification device according to claim 9, wherein, the identification unit further includes:

a correction module which is used to correct the stored corresponding palm template information by using the current user's palm information after the current user's palm information is successfully identified.

11. A mutual-capacitance palm print touch panel, which includes a mutual-capacitance palm print touch device including:

a touch sensor which is used to, through a mutual-capacitance touch panel, acquire capacitive sensing data obtained from a palm pressing by a user and form user's palm template information and current user's palm information;

a touch controller which is used to control the touch sensor for acquiring the capacitive sensing data and process and store the obtained palm template information and the current user's palm information; and an identification unit which is used to compare the processed current user's palm information with the processed palm template information and output the result of the comparison, wherein, the identification unit includes:

a feature information point detection module which is used to perform a feature information point detection on the current user's palm information and output a detected error, the feature information point detection being used for detecting unique point features of the palm print;

a large area information point detection module which is used to perform a large area information point detection on the current user's palm information and output a detected error, the large area information point detection being used for detecting the large area geometric feature of the root of the thumb of the palm;

a line information detection module which is used to perform a line information detection on the current user's palm information and output a detected error, the line information detection being used for detecting the line feature for each of the main lines;

a non-reporting detection module which is used to perform a non-reporting detection on the current user's palm information and output a detected error, the non-reporting detection being used for detecting the information about the non-pressing positions of the palm; and a relative position detection module which is used to detect the relative positions among the detected results obtained from the feature information point detection, the large area information point detection, the line information detection and the non-reporting detection and output a detected error.

12. The mutual-capacitance palm print touch panel according to claim 11, wherein, the touch controller further includes:

a filtering module which is used to perform a filtering and noise reduction process on the obtained capacitive sensing data;

an amplification module which is used to perform a signal amplification process on the filtered and noise reduced capacitive sensing data; and an analog-to-digital conversion module which is used to perform an analog-to-digital conversion process on the amplified capacitive sensing data.

13. The mutual-capacitance palm print touch panel according to claim 11, wherein, the identification unit further includes:

a judgment module which is connected with the feature information point detection module, the large area information point detection module, the line information detection module, the non-reporting detection module and the relative position detection module, respectively, and is used to compare the detected errors output from the feature information point detection module, the large area information point detection module, the line information detection module, the non-reporting detection module and the relative position detection module with the predetermined corresponding error thresholds, and if each of the detected errors is smaller than the predetermined corresponding error threshold, it is judged that the current user's palm information is successfully identified; otherwise, the identification is failed.

14. The mutual-capacitance palm print touch panel according to claim 13, wherein, the identification unit further includes:
   a correction module which is used to correct the stored corresponding palm template information by using the current user's palm information after the current user's palm information is successfully identified.

* * * * *